A. SEELIG.
TIRE.
APPLICATION FILED SEPT. 6, 1911.

1,017,598.

Patented Feb. 13, 1912.

Witnesses:
Kenneth Romanes
E. Beckers-Scheins

Inventor:
Arthur Seelig,
by Paul D. Schilling
Attorney.

UNITED STATES PATENT OFFICE.

ARTHUR SEELIG, OF WILMERSDORF, BERLIN, GERMANY.

TIRE.

1,017,598. Specification of Letters Patent. Patented Feb. 13, 1912.

Application filed September 6, 1911. Serial No. 647,802.

*To all whom it may concern:*

Be it known that I, ARTHUR SEELIG, a subject of the German Emperor, and residing at Wilmersdorf, Berlin, German Empire, have invented certain new and useful Improvements in Tires, of which the following is a specification.

My invention pertains to a wheel tire of that type in which resilient split rings slide between the inner and outer parts of a rim, and the invention contemplates the removal of certain defects attaching to prior tires of this class, and in particular the prejudicial shifting of the rings in the plane of the tire, and the undesirable rotation of the rings about their center.

I attain my object by providing for the complete inclosure of those portions of the rings which lie between the two parts of the rim, and by causing engagement between the ends of each ring and the rim by a projection on the one member coöperating with a recess in the other member.

Other advantageous features of the invention will be understood from the following description and claims.

A preferred embodiment of my invention is illustrated in the accompanying drawing, in which—

Figure 1:
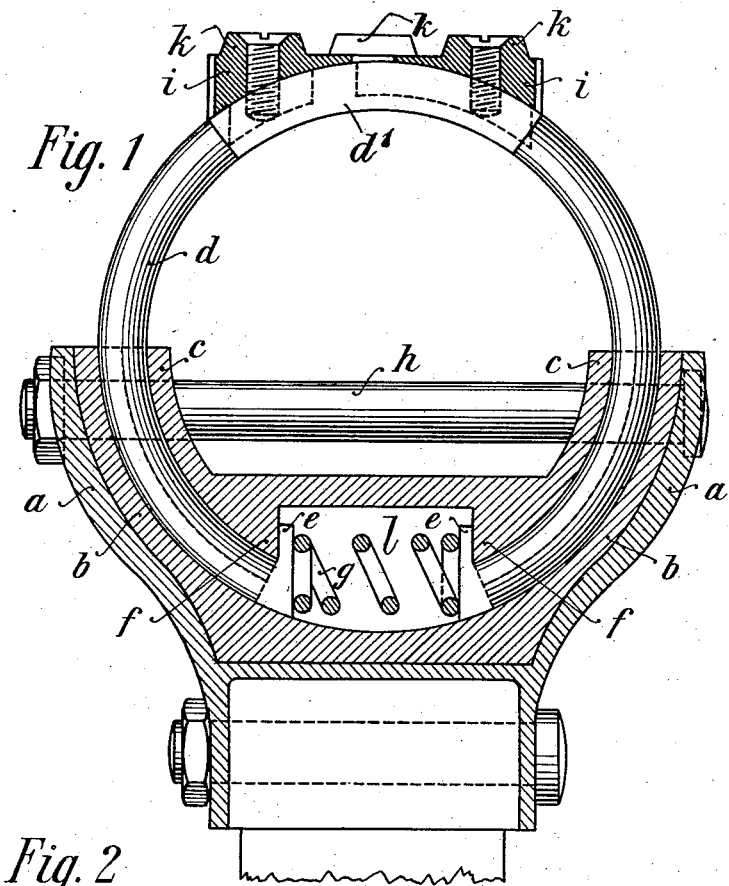
Figure 2:
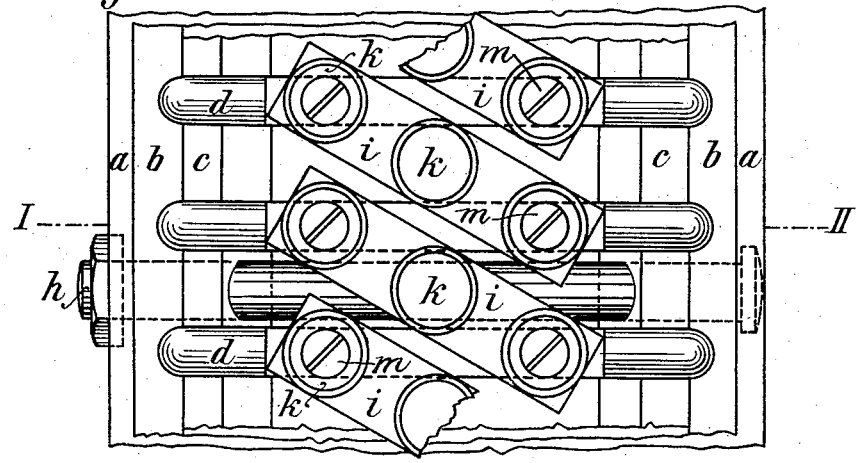

Figure 1 is a cross section through the tire on the line I—II of Fig. 2, and Fig. 2 is a plan of a portion of the tire shown in Fig. 1.

$a$ is the outer member of the rim, provided with a lining $b$ preferably of aluminium, and $c$ is the inner rim-member, concentric with the part $a$ and likewise preferably of aluminium. The lining $b$ and the inner member $c$ present semi-circular grooves, and into these latter there fit snugly the legs of the round, resilient split rings $d$, of which substantially one half thus lies completely inclosed by the two rim parts, with capability of sliding up and down, but not of shifting laterally.

The ends of the rings $d$ are furnished with projections or shoulders $e$, which bear against the walls $f$ of a recess $l$ provided in the underside of the member $c$. Between the shoulders $e$ of each ring there is located a helical spring $g$, which augments the resilience of the ring and in particular aids in returning it to its initial position after it has been subjected to tension. In this manner the rings are prevented from getting displaced through rotation about their center, whereby fracture of the ring is liable to occur.

It is obvious that instead of the rings being provided with projections and the rim with a recess, the arrangement might be the reverse, that is to say, the rim might be furnished with projections and the rings recessed.

To hold the two parts $a$, $c$ of the rim together and prevent turning of the inner part $c$ upon the lining $b$, screw-bolts $h$ may be passed through the structure at intervals, in the spaces between the rings.

With a view to preventing direct wear and tear of the rings their tread portion may be protected by shoes $i$, presenting elevations or studs $k$ and attached to the rings by screws $m$. The shoes thus constitute the actual tread-surface and are preferably so disposed that each shoe unites two adjacent rings, whereby bending of the upper half of the rings is prevented. In order to afford the shoes a good seat, the tread portion $d^1$ of the rings $d$ may be of rectangular cross section.

Instead of a composite rim, consisting of two separate members $a$ and $c$, it is manifest that an integral rim might be employed, having passages of circular cross-section to receive the rings $d$.

The manner of assembling the parts is as follows: The ends of the split rings $d$ are drawn apart sufficiently to admit of their being fitted into the grooves in the inner rim-member $c$, which is formed of a number of segments. The coiled springs $g$ are then inserted between the ring ends, whereupon the so assembled elements $c$, $d$, $g$ are placed in the grooves of the outer rim-member $a$, $b$ and all the parts secured in position by the bolts $h$, as shown in Fig. 1.

Having thus described my invention, I claim as new—

1. A tire, comprising a rim, and split resilient rings located transversely thereof, the lower part of the legs of each ring being completely inclosed by the rim, and means for preventing rotation of the rings within the rim, consisting of a projection on the one part engaging in a recess in the other part, and a compression-spring located in the gap between the two ends of the ring.

2. A tire including a rim having passages formed therein, split rings having their ends sliding in said passages, and coil springs interposed between the ring ends.

In testimony whereof I affix my signature in presence of two witnesses.

ARTHUR SEELIG.

Witnesses:
 HENRY HASPER,
 ARTHUR SCHROEDER.

Copies of this patent may be obtained for five cents each, by addressing the "Commissioner of Patents, Washington, D. C."